Aug. 3, 1937.                    W. DRESE                    2,088,847
       MACHINE FOR PUNCHING, DRAWING, OR LIKEWISE FORMING
              OF ARTICLES OF PAPER, CARDBOARD, ETC
                      Filed Sept. 15, 1936        6 Sheets-Sheet 1
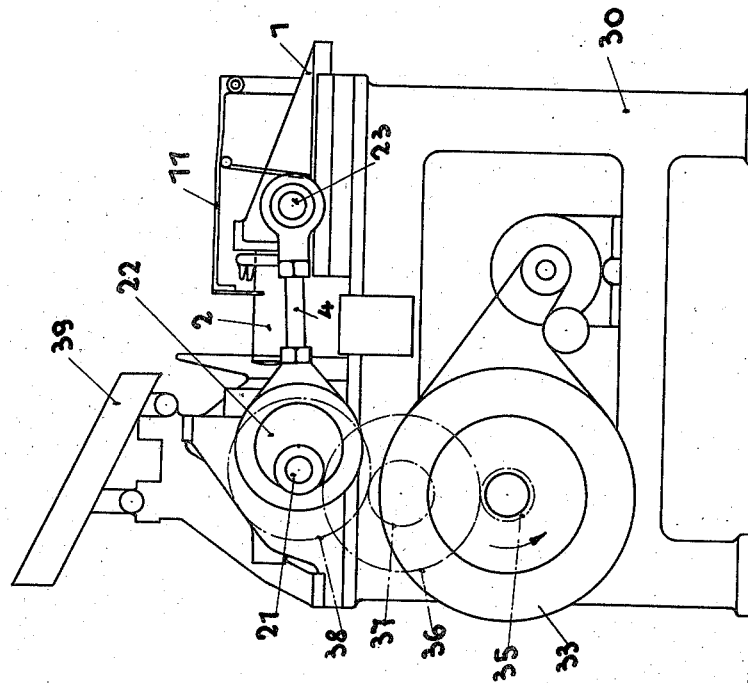
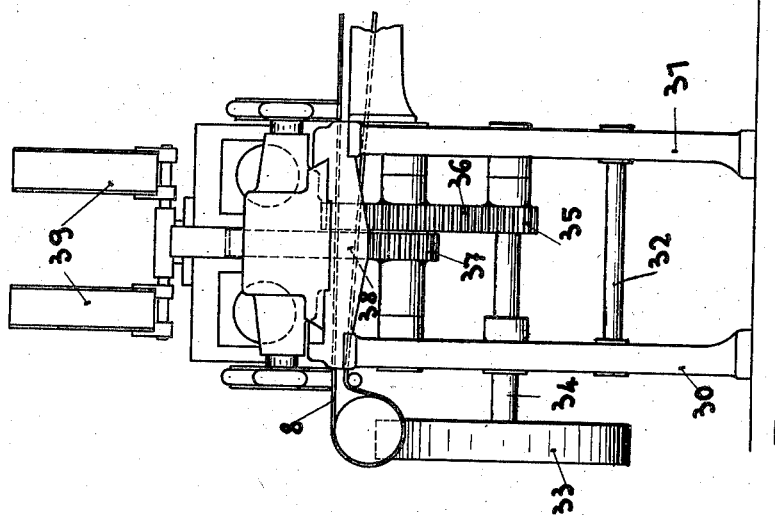
Inventor
Wilhelm Drese
by
Atty.

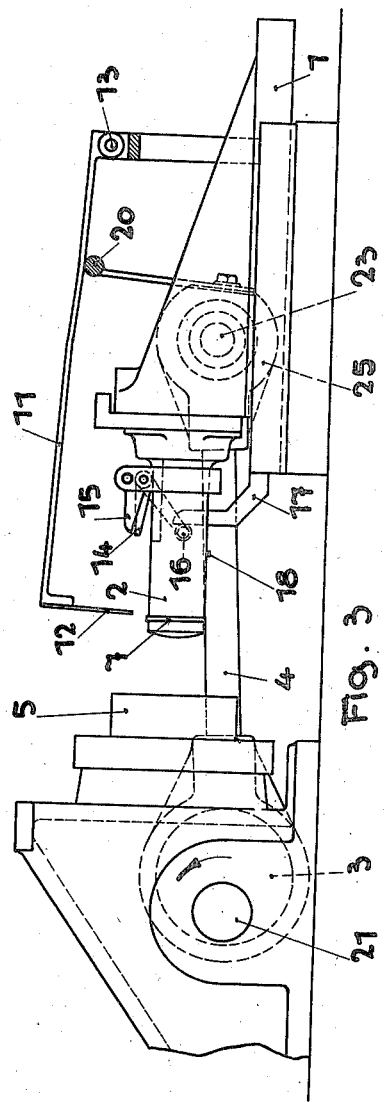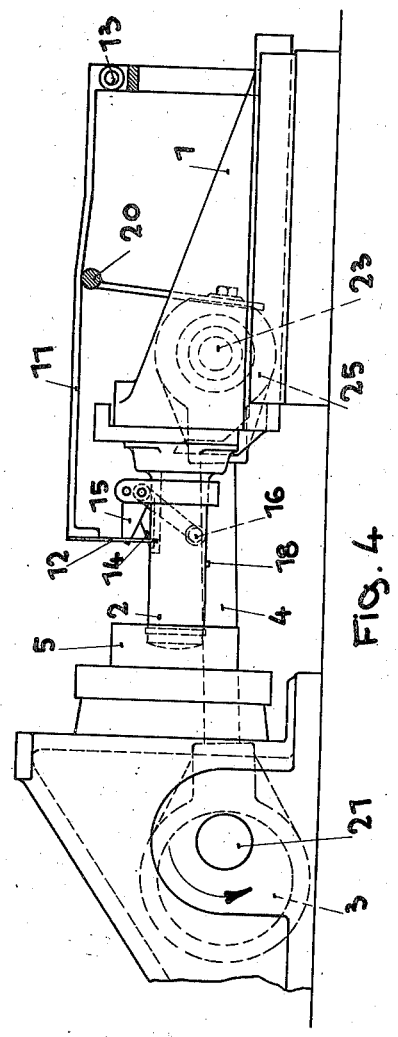

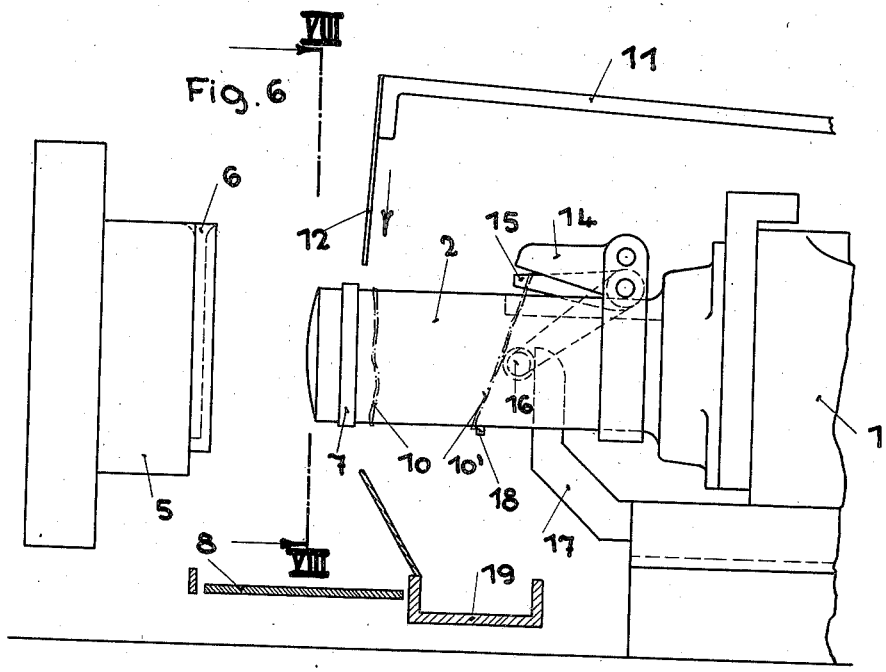
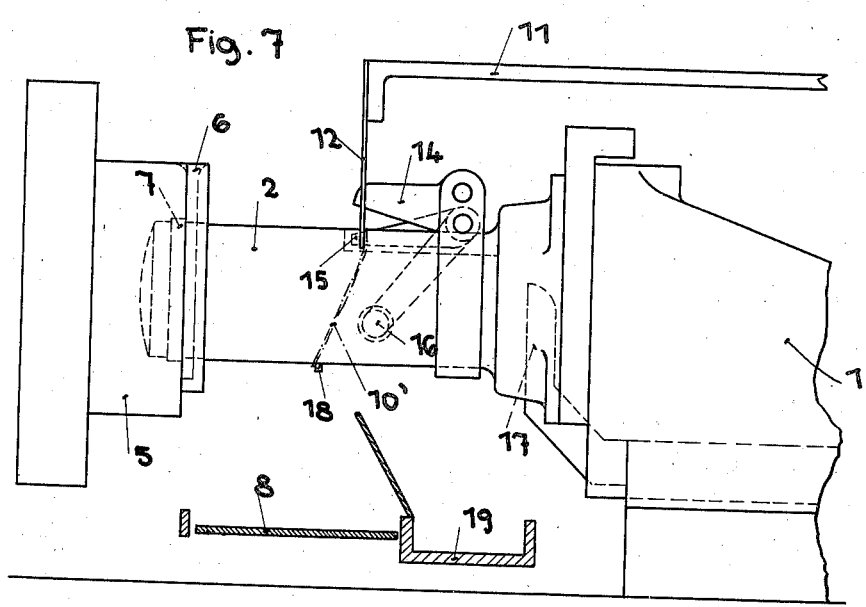

Inventor
Wilhelm Drese
by
Atty

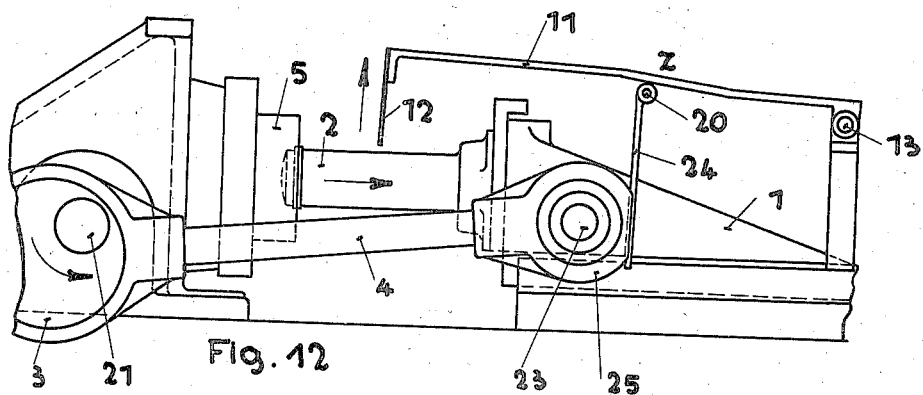
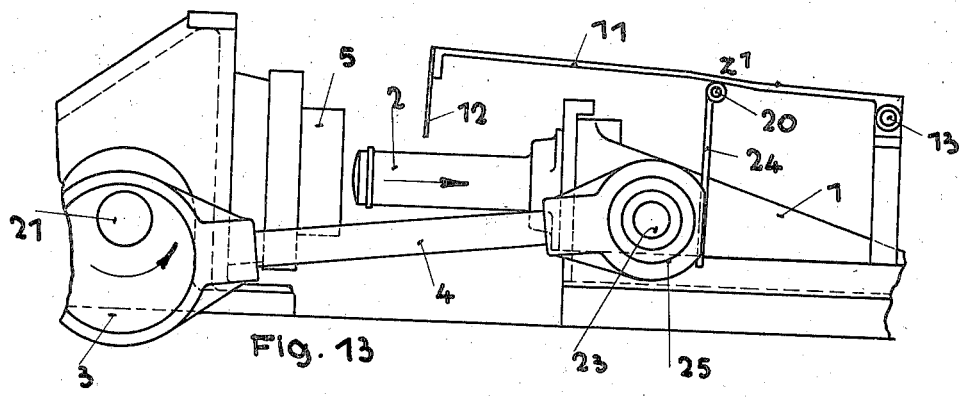
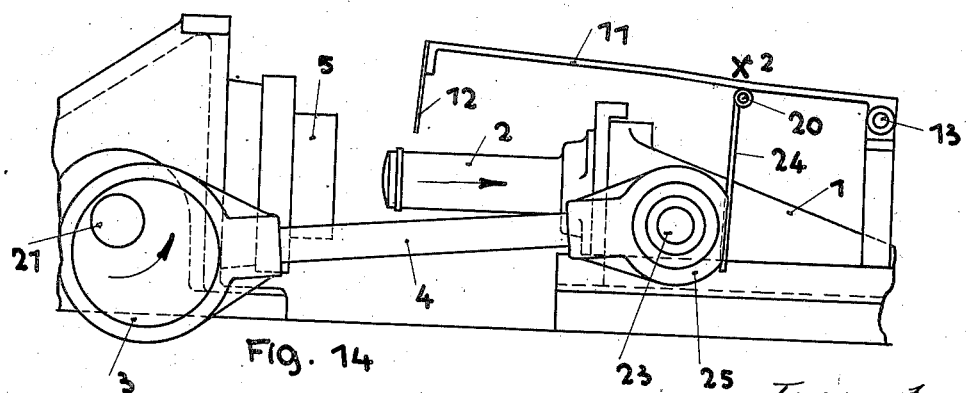

Patented Aug. 3, 1937

2,088,847

UNITED STATES PATENT OFFICE 2,088,847

MACHINE FOR PUNCHING, DRAWING, OR LIKEWISE FORMING OF ARTICLES OF PAPER, CARDBOARD, ETC.

Wilhelm Drese, Dusseldorf, Germany

Application September 15, 1936, Serial No. 100,963
In Germany September 23, 1935

11 Claims. (Cl. 164—41)

This invention relates to a machine for punching, drawing or likewise forming of articles of paper, cardboard, etc., and more specifically relates to a device for removing the waste strips from punching or drawing plunger dies and similar tools.

In the hitherto known machines for punching or drawing the trimmed waste strips or rings pile themselves one after the other on the plunger die and finally cause an obstruction of the punching or drawing tools if they are not removed by hand in time. Such troubles are avoided according to my invention.

One of the objects of my invention is to arrange scissor-like acting tools on the plunger die in such a manner that the waste strips are slit by these scissor-like acting tools.

Another object of my invention is to provide fork elements by which the waste strips being on the plunger die are retained contrary to the forward movement of the plunger die until they are fed into the above-mentioned scissor-like acting cutting device by which said waste strips are slit.

A further object of my invention is to provide the plunger die with a stop which effects a tension of the waste strip being retained by the fork element during the cutting process of the scissor-like acting tools.

A still further object of my invention is to arrange suitable driving means as well for the scissor-like acting tools as for the fork elements retaining the waste strips on the plunger die.

With these objects in view and such others as may hereinafter appear, the invention consists in the machine for punching and drawing as hereinafter described and particularly defined in the claims at the end of this specification.

A preferred embodiment of my invention is illustrated in the drawings.

Fig. 1 is a front elevation of the complete machine.

Fig. 2 is a side elevation of the complete machine.

Fig. 3 is an enlarged side elevation of the acting tools, i. e. of the punching and drawing dies, of the scissor-like acting tools slitting the waste strips, and of the fork elements retaining the waste strips.

Fig. 4 is a similar side view showing the device with pushed forward plunger die and inclined fork element.

Figs. 6 and 7 show the plunger die and the cutting device in the position illustrated in Figs. 3 and 4 in an enlarged scale.

Figs. 9–14 show the plunger die and the fork element in the different positions.

Figure 5:
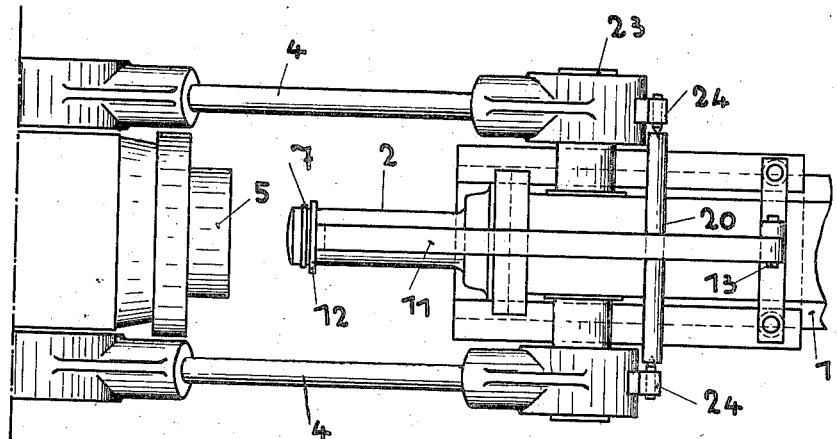
Fig. 5 is a plan view of one set of the mentioned tools.

As mainly illustrated by Figs. 1 and 2, the body frame of the machine consists of two uprights 30, 31 which are connected by bars 32.

The machine is driven by the pulley 33 fixed to the shaft 34 arranged in suitable bearings. The rotating movement of the shaft 34 is transmitted by the toothed wheels 35, 36, 37 and 38 to the main shaft 21. By means of the excentric discs 22 and the excenter rods 4, the punching and drawing plunger dies 2 are moved in a well-known manner. These plunger dies 2 are fitted to a slide 1 guided in the frame of the machine.

The drawing hollows 5 against which the plunger dies 2 are moved are arranged at the other end of the machine. The blanks to be punched and drawn are arranged in boxes 39 and are fed by well-known means into the slot 6 of the drawing hollow (Figs. 6 and 7). By means of the same stroke by which the blank is drawn, a waste strip 10 is produced and strung on the die 2. This production of the waste strip is done by the knife 7 of the drawing plunger die. Whilst the drawn work piece is ejected out of the drawing plunger die after the drawing process for being transferred by a conveyor band 8, the waste strip slides over the drawing die.

Figure 8:
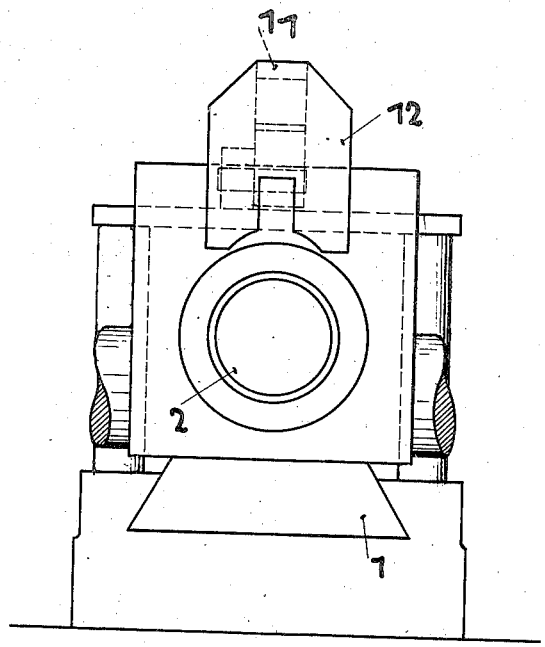
Fig. 8 is a vertical section according to line VIII—VIII of Fig. 6.

As illustrated in Figs. 6 and 7, the waste strips 10 produced, which is found on the plunger die 2, is taken back by the friction when the plunger die 2 returns. In order to avoid that it is brought forward again by the forward movement, a fork element 11 has been provided which is so controlled that it positions its forked front part 12 in predetermined relation to the plunger die 2, between the knife ring 7 and the waste strip 10. During the forward movement of the plunger die the waste strip is retained and in this manner its position 10 illustrated in Fig. 6 is changed into that of position 10' of Fig. 7, so that its upper rim is moved into the operative plane of the cutting device 14, 15 which is operated by its roll 16 striking against the stop 17. The scissor-like cutter 15 is rigid on a shaft journaled in a fitting on die 2, the other end of the shaft being provided with an arm on which roll 16 is journaled to strike stop 17, fixed to a stationary part of the machine, when die 2 is moved away from the drawing hollow 5. The cutter 14 is immovably fixed to said fitting on die 2. When roll 16 engages stop 17, the part 15 is moved upwardly to coact with part 14 to cut the strips 10. As is evident from Fig. 6, the waste strip 10' is to be found in a slanting position during the cutting, since the lower part of the waste strip is limited in movement by means of the stop 18. Owing to the effect of the fork element the waste strip is so tensioned that it snaps off the drawing plunger die 2 and falls into the collecting trough 19 (Fig. 6) immediately it has been cut. The front part 12 of the fork element 11, which is arranged at 13, is formed fork-like (Fig. 8) in order to engage the waste strip with certainty at its upper rim. In the example of performance the bar-like part 11 of the fork element is rested on a support 20, the position of which is variable in relation to the fork element. The controlling of the support is simultaneously done with the movements of the plunger die 2 and the slide 1.

Figure 9:
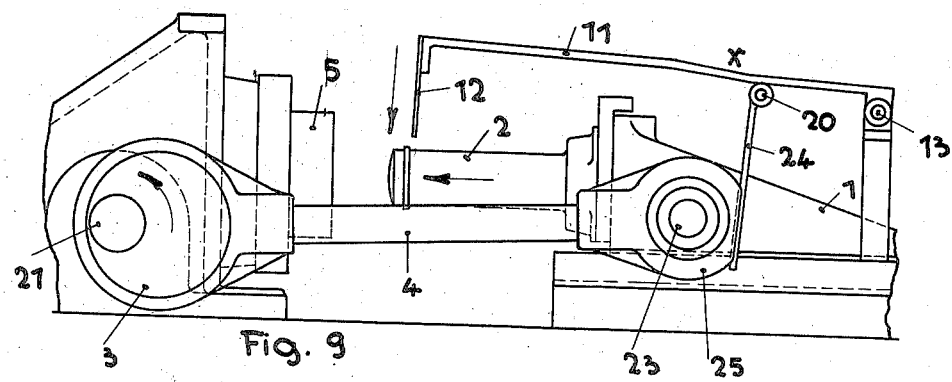
Figure 10:
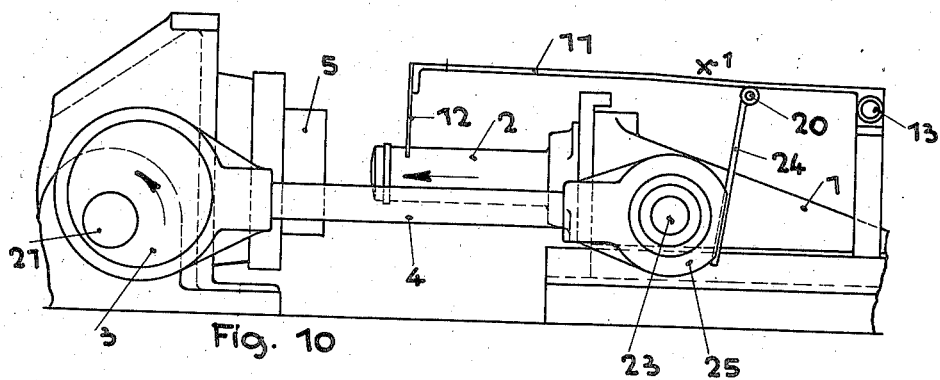
Figure 11:
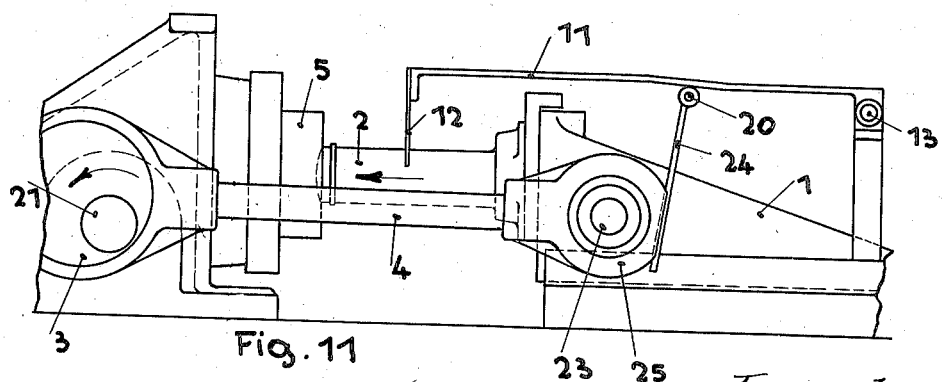

The position of the fork element 11/12 is illustrated in Figs. 9–14 in variations of the support 20. Fig. 9 shows the plunger die 2 in the utmost position, i. e., completely withdrawn. In Fig. 10 the excenter 3 is turned forward by about 45° in an anti-clockwise direction. The slide 1 and the plunger die 2 have slightly approached the drawing hollow 5. The support 20 connected with the head of rod 25 by bar 24 has moved from place $x$ to place $x'$ (Figs. 9 and 10). Hereby the fork-like end 12 of the fork element has moved in a direction toward the plunger die 2. In Fig. 11 all movements are illustrated in a more progressed state and that is just before the termination of the stroke to the inside, i. e. in direction to the drawing hollow 5. Hereby the support 20 has been shifted from position $x^1$ of Fig. 10 to position of $y$ of Fig. 11 of the fork element 11. The fork element itself is still more lowered.

Figs. 12 and 13 show the die 2 just after the beginning of its return-movement. The support 20 travels from $z$ over $z^1$ to $x^2$. It approaches, therefore, the fixed turning point 13 of the gripper, whereby the gripper is lifted and its end 12 is removed from the die.

In the example of performance the support 20 is fitted to the head 25 of the excenter rod 4 by means of a bar 24. On account of the oscillation of the bar 24 caused by the motion of the excenter rod the stroke of the support 20 is greater than that of the slide 1. Hereby the stroke of the gripper is sufficiently great for safely engaging over the waste strip.

It will be understood that suitable modification will be made in the design of the described engaging and slitting tools. However, it is not necessary to illustrate herein such modified design of the mentioned tools, as such modification being within the scope of my invention may be used readily by those skilled in the art.

Whilst the preferred embodiment of my invention has been illustrated and described herein, it will be understood that my invention may be embodied in other forms within the scope of the following claims:

What is claimed to be new is:

1. A machine for punching, drawing or likewise forming of articles of paper, cardboard, and the like, including a device for removing the waste strips from the plunger dies, said device consisting of scissor-like acting tools which are arranged on the plunger die.

2. A machine for punching, drawing or likewise forming of articles of paper, cardboard, and the like, including a device for removing the waste strips from the plunger dies, said device consisting of scissor-like acting tools, one of such tools being fixed to the plunger die and the other movably arranged on the plunger die.

3. A machine for punching, drawing or likewise forming of articles of paper, cardboard, and the like, including a device for removing the waste strips from the plunger dies, said device consisting of scissor-like acting tools which are arranged on the plunger die and which are operated in the movements of the plunger die.

4. A machine according to claim 3 having a slitting tool movably arranged on the plunger die and a stop by which said movable tool is actuated when the plunger die approaches the end of its stroke.

5. A machine for punching, drawing or likewise forming of articles of paper, cardboard, and the like, including a device for removing the waste strips from the plunger dies, said device consisting of a fork element retaining the waste strips against the forward movement of the plunger die and of scissor-like acting tools arranged on the plunger die, the fork element directing the waste strips to the scissor-like tools for severance by the latter.

6. A machine according to claim 5, wherein the plunger die is provided with a stop to effect a tension of the waste strip being acted on by the fork element.

7. A machine according to claim 5, wherein the fork element is linked to a fixed turning point and rests on a shifting support.

8. A machine according to claim 5 wherein a shifting support is provided for the fork element and operated to produce an upward and downward movement of the fork element, the shifting support being fixed to a slide fitted with the plunger die.

9. A machine for punching, drawing or likewise forming articles of paper, cardboard, or the like, including means for preventing the waste material produced in one die operation from moving with the die in a succeeding operation, and means for severing the retained waste material to permit its delivery beyond the die.

10. A machine for punching, drawing or likewise forming articles of paper, cardboard, or the like, through the action of a die, comprising means for holding the waste material encircling the die following one die operation from moving with the die in a succeeding operation, and cutting means for severing the waste material so held, the cutting means being carried by the die.

11. A machine for punching, drawing or likewise forming articles of paper, cardboard, or the like, through the use of a die, comprising means for preventing the waste material encircling the die following one operation from moving with the die in a succeeding operation, means operative in the movement of the die for exerting tension on said waste material, and means operated by the die for severing the waste material while under tension to provide for the discharge of the waste material from the die.

WILHELM DRESE.